United States Patent [19]

Bursztejn et al.

[11] Patent Number: 4,559,499
[45] Date of Patent: Dec. 17, 1985

[54] DIRECT MICROWAVE DEMODULATOR OF PSK SIGNALS WITH AUTOMATIC GAIN CONTROL

[75] Inventors: Jacques Bursztejn, Paris; Michel Part, Les Essarts le Roi, both of France

[73] Assignee: Thomson-CSF, Paris, France

[21] Appl. No.: 591,448

[22] Filed: Mar. 20, 1984

[30] Foreign Application Priority Data

Mar. 25, 1983 [FR] France ............................... 83 04983

[51] Int. Cl.[4] .......................... H03D 3/18; H03D 3/24
[52] U.S. Cl. ..................................... 329/50; 329/107; 329/122; 329/124; 329/131; 375/81; 375/94; 375/120; 455/214
[58] Field of Search ................. 329/50, 107, 122, 124, 329/131, 132, 133; 375/81, 94, 120; 455/214

[56] References Cited

U.S. PATENT DOCUMENTS

| | | | |
|---|---|---|---|
| 3,706,946 | 12/1972 | Bickford et al. | 329/50 X |
| 4,285,060 | 8/1981 | Cobb et al. | 375/120 X |
| 4,338,574 | 7/1982 | Fujita et al. | 329/50 X |

FOREIGN PATENT DOCUMENTS

| | | |
|---|---|---|
| 892690 | 9/1982 | Belgium . |
| 2800242 | 7/1978 | Fed. Rep. of Germany . |
| 2353186 | 12/1977 | France . |
| 0137309 | 8/1983 | Japan ..................................... 329/131 |

OTHER PUBLICATIONS

Fujitsu, vol. 11, No. 4, Dec. 1975, Kawasaki (JP), T. Yamashita et al.: "Synchronous Phase Demodulators for High Speed Quadrature . . . ".
Patents Abstracts of Japan, vol. 5, No. 27, 18 Feb. 1981, (e-46) (699), & JP-A-55 154 855 (Ricoh K.K.) (02-12011980).

Primary Examiner—Paul Gensler
Assistant Examiner—D. C. Mis
Attorney, Agent, or Firm—Roland Plottel

[57] ABSTRACT

The microwave reception chain according to the invention comprises a direct microwave demodulation device comprising a demodulation circuit associated with an oscillator operating at the microwave carrier frequeny, controllable to coincide in phase with the carrier received. The demodulation circuit comprises a separator coupled to the input for the received signal and connected to two symmetrical mixers which respectively receive the carrier from the oscillator and the same carrier shifted through 90° which are available at the output of a coupler having a phase shift of 90°, the outputs of the mixers being connected to low-pass filters restoring the demodulated digital sequences. The reception chain comprises an automatic gain control circuit in the base band and a phase calculator receiving the demodulated digital sequences.

3 Claims, 7 Drawing Figures

DIRECT MICROWAVE DEMODULATOR OF PSK SIGNALS WITH AUTOMATIC GAIN CONTROL

BACKGROUND OF THE INVENTION

1. Field of the Invention

The invention relates to the field of radioelectric transmission of digital data and relates more particularly to a reception chain comprising a direct microwave demodulation device.

2. Description of the Prior Art

The usual microwave reception chains comprise, in series after the reception antenna, a microwave band filter followed by a low-noise amplifier, then by a mixer performing a transposition into intermediate frequency by means of a local reception oscillator. The chain furthermore comprises an intermediate frequency preamplifier, cells for correcting the group propagation time, and an intermediate frequency amplifier. The circuit for demodulation of the intermediate frequency signal then permits restoring the signal in a base band, the coded signal being restored after processing of the signal in the base band. In such reception chains, the double transposition of microwaves into intermediate frequency and then from the intermediate frequency into the base band, leads to utilising a whole array of intermediate frequency circuits, with a local oscillator in particular.

A description has been given in the FUJITSU periodical, vol. 11, No. 4 of Dec. 1975 KAWASAKI, pages 63 to 67, in an article titled: "Synchronous phase demodulators for high speed quadrature PSK transmission systems" of a microwave reception chain of a more simple structure which makes it possible to perform a direct demodulation on a received microwave signal, with a smaller number of elements, the intermediate frequency circuits being omitted.

In this arrangement, no means are provided for maintaining a constant level at the output of the reception chain. However it is essential to incorporate such a level control.

One obvious solution to this problem consists in providing an automatic gain control upstream of the demodulator, for the microwave signal received. However, a solution of this kind leads to making use of variable microwave "PIN" diodes, which are interposed between microwave amplifiers. Furthermore, the dynamic of the input signal being of the order of 55 dB, it is necessary that the dynamic of the control circuit should be at least 55 dB, which in a solution of this kind requires a costly circuit to be located upstream of the demodulator.

SUMMARY OF THE INVENTION

The problem resolved by the present invention consists in the provision of a direct demodulation microwave reception, chain which, in association with other functions, comprises the automatic gain control function, the elements needed to establish this function being conventional commercial circuits which enable a reduction in the cost of the reception chain as a whole whilst retaining its performance.

Accordingly, the present invention provides a microwave reception chain comprising a circuit for direct demodulation of a modulated signal resulting from mixing two carriers in quadrature modulated by digital signals scrambled so as not to comprise long series of one or zeros, of which the input is coupled with the received signal input, associated with an oscillator operated at the carrier frequency of the received signal, controllable so that the phase of the carrier coming from the oscillator coincides with the phase of the signal received and supplying demodulated digital signals, and furthermore comprising a phase calculator having two inputs coupled to the output for demodulated digital signals, of which the output provides a signal as a function of the phase difference between the received carrier and the local carrier, this output being connected to the control input of the oscillator via a loop integrator filter, wherein the arrangement also comprises means for automatically controlling the level of the demodulated signals X(t) and Y(t), comprising wide-band amplifiers whose signal inputs are coupled to the outputs of the demodulation circuit, and which comprise an automatic gain control input, the outputs of these amplifiers being connected to the inputs of a control circuit comprising integrating means, and of which the outputs are connected to the control inputs of the amplifiers.

BRIEF DESCRIPTION OF THE DRAWINGS

The invention will be better understood and other features will appear from the following description given with reference to the accompanying drawings, in which:

FIGS. 6 and 7 are explanatory tables.

DESCRIPTION OF THE PREFERRED EMBODIMENT

The sphere of the invention is the radioelectric transmission of digital data, the transmission being performed by modulation of a microwave (SHF) carrier wave which may be represented by the combination of two independently modulated carrier waves in quadrature. A linear modulation device has been described in French patent application No. 80 03976 filed in the applicants' name, in which the modulation is performed directly on the SHF carrier, without transposition into an intermediate frequency. To this end, the digital modulation device utilised is linear for the modulation signal applied to it.

The object of the present application is a reception chain incorporating direct microwave demodulation, integrating all the functions necessary for processing modulated microwave signals, such as result for example from this linear digital modulation device.

Such a direct microwave demodulation raises a definite number of problems in respect of the demodulation system as such, that is to say the mixer, as well as of the reception chain as a whole. As a matter of fact, selection of the kind of mixer utilised, and the characteristics of the signals applied to the same, and consequently the processing operations required, are interdependent.

Figure 1:
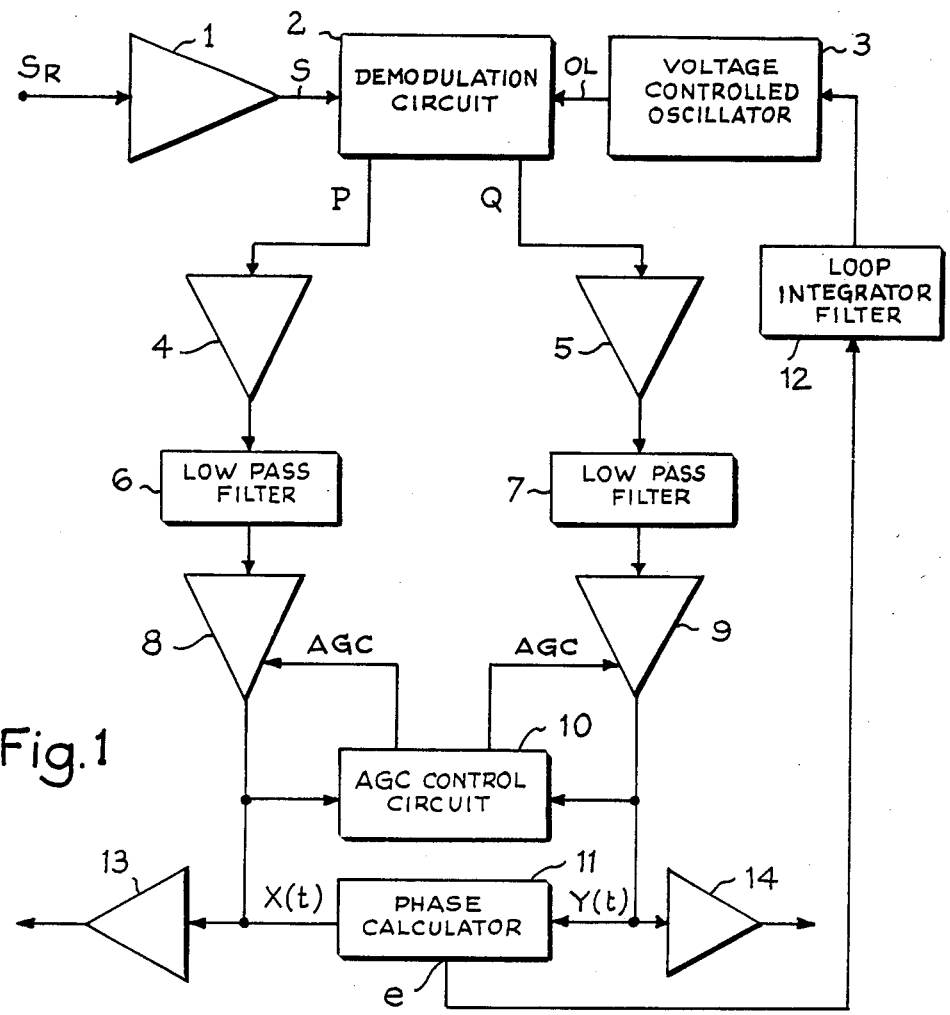
FIG. 1 is a block diagram of one embodiment of a reception chain in accordance with the invention.

FIG. 1 illustrates the block diagram of one embodiment of the reception chain according to the invention. The input supplied with the received signal $S_R$ is connected to the input of a low-noise amplifier 1 whose output is connected to the input for a modulated signal S of a demodulation circuit 2. In the embodiment described, the received signal consists of two carrier waves in phase quadrature which are modulated by two synchronous digital signals and form a modulated signal having four phase conditions. This circuit equally comprises an input for a local oscillation signal OL connected to the output of a voltage-controlled oscillator 3. At its two outputs, this mixer supplies the signals P and Q of modulation in the base band. The signals P and Q are fed respectively to the input of two video-frequency preamplifiers, 4 and 5. The outputs of these two preamplifiers are respectively connected to the inputs of the two low-pass filter circuits 6 and 7 whose outputs are connected to the inputs of the automatic gain control amplifiers 8 and 9. The outputs of these amplifiers which deliver the demodulated digital sequences X(t) and Y(t) are connected to the inputs of two output amplifiers 13, 14 and to the inputs of an automatic gain control circuit 10 for the amplifiers 8 and 9. The outputs of these amplifiers 8 and 9 are equally connected to the inputs of a phase calculator circuit 11 whose output provides an error signal e(t) fed to the input of a loop integrator filter 12 whose output is connected to the frequency control input of the voltage-controlled oscillator 3.

The operation of this reception chain is as follows: the received signal which passes through the low-noise amplifier 1 is able to maintain the noise factor at a low value, for example 2.5 dB. The mixer 2 is a double symmetrical linear mixer of which a more detailed diagram will be given in the following and which makes direct delivery of the two demodulated signals in the base band; the videofrequency amplifiers have a gain of say 10 dB and precede the signal filters; the automatic gain control amplifiers 8 and 9 have a fixed gain to which may be added a controllable gain variation, for example fixed of 20 dB and variable of 50 dB which may be varied via the control input; the signals fed to the phase calculator 11 and to the output amplifiers 13 and 14 consequently have a constant peak amplitude.

Figure 2:
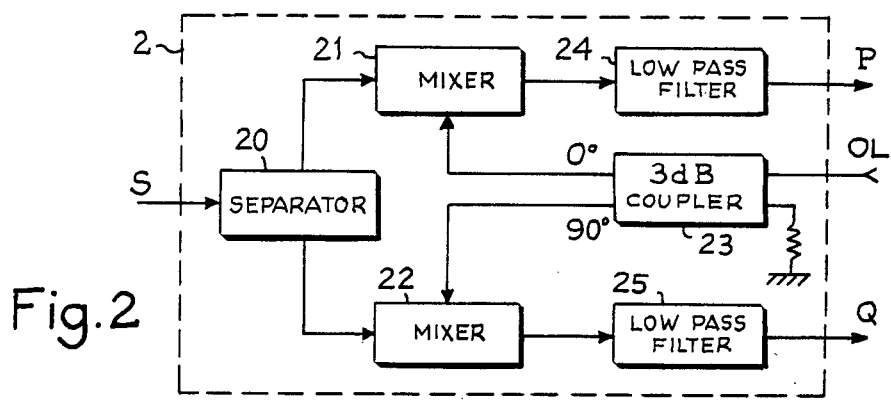
FIG. 2 is a block diagram of the demodulation device.

FIG. 2 is a block diagram of the demodulation circuit 2. For a signal comprising two carriers modulated in quadrature, the demodulation device 2 comprises: a separator 20 connected to the input for the signal S, and enabling the input signal to be divided into two, the two outputs of the separator being connected to the inputs of two identical mixers 21 and 22. The local oscillation signal LO input is connected to the input of a 3 dB coupler 23 whose outputs are phased shifted 90° with respect to each other. The two outputs of this 3 dB coupler 23 are connected to the second inputs of the two linear mixers 21 and 22. The frequency of the local oscillator is equal to the carrier frequency of the signal received. The mixers 21 and 22 consequently provide, after filtering in the low-pass filters 24 and 25 and to the extent to which the phase difference between the carrier signal and the local oscillation signal is zero, the demodulated signals P and Q.

The signal received has the form:

Z(t) = P(t) cos [ωot + φ(t)] in which φ(t) is the modulation phase:

$$\phi(t) = \frac{\pi}{4} + k(t)\frac{\pi}{2}.$$

Z(t) = X(t) cos ωot + Y(t) sin ωo(t), by separation into two carriers in quadrature.

The local oscillator has the same frequency as the signal and has the form L = 1 cos ωot. After the coupler 23, the local carriers in quadrature are:

$$L_1 = \frac{1}{\sqrt{2}} \cos \omega ot$$

$$L_2 = \frac{1}{\sqrt{2}} \sin \omega ot$$

In the first mixer 21, the signal resulting from the mixing action is a modulation product having a second degree component on each of the diodes. The low-pass filtering action permits restoring the digital modulation signal in the base band into cos φ(t). Similarly, the signal resulting from the mixing action in the second mixer 22 and after low-pass filtering, permits restoring the digital signal in the base band into sin φ(t).

This circuit may resemble a microwave direct modulation circuit constructed according to the same technology, such as is described by way of example in the patent application referred to in the foregoing. Nevertheless, the quality of demodulation is closely linked with the quality of the local oscillation signal and consequently with its phase accuracy and with the quality of the local oscillation coupler. This coupler should actually have a very high phase stability throughout a wide band and a very satisfactory balance between the two coupling branches. As a result, in a preferred form of embodiment of the invention, the coupler has been produced on a different board than that carrying the other elements of the demodulation circuit, so that no imbalance may be caused between the two coupling branches.

With a circuit of this kind, the demodulation spectrum is very close to that transmitted. Furthermore, the form of the demodulation spectrum is retained when the reception power fluctuates.

Nevertheless, the mixer output level is certainly a function of the power received. As a result, in order to maintain a constant level at the output of the reception chain, it is necessary to provide an automatic control for the gain of the reception chain. This control is an important element of the reception chain according to the invention.

This gain control cannot be established by acting on the level of the local oscillator 3. As a matter of fact, variations controlled at the level of the local oscillator cause substantial distortions of the demodulated signal spectrum. Moreover, the variation of the level of the output signal of the demodulator as a function of the oscillator level, is not linear.

This necessitates the provision of the automatic gain control either in the microwave region, by utilising an automatic gain control microwave amplifier, but this solution is costly as stated in the foregoing, or in the base band (videofrequency).

Figure 3:
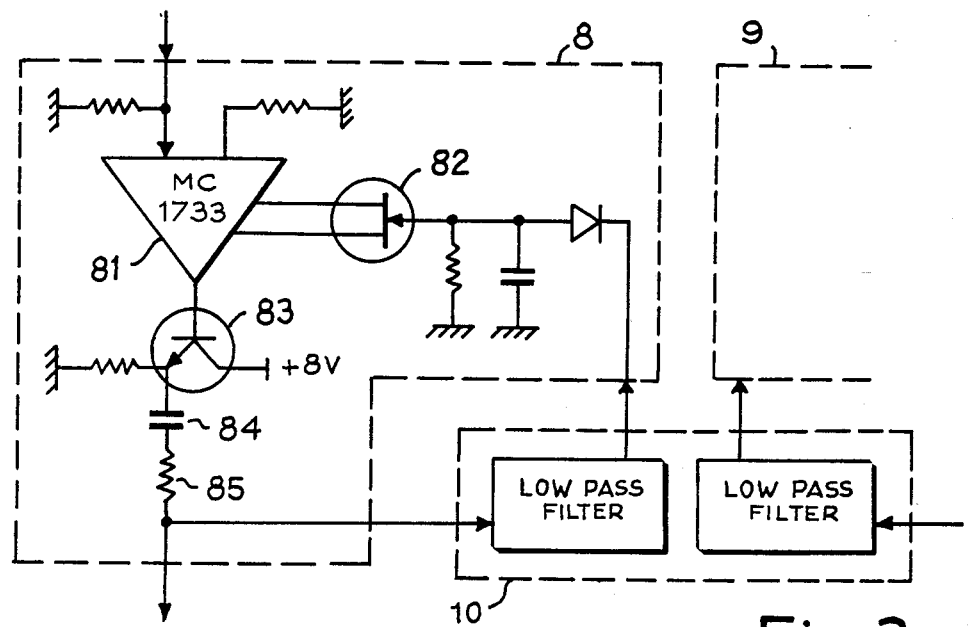
FIG. 3 is a circuit diagram of one of the AGC amplifiers with its control circuit.

In the reception chain according to the invention the automatic gain control is operated on the signal demodulated in the base band. This is rendered possible by the fact that the modulation signals resulting from the coding action upon transmission, are signals processed by "scrambling", that is to say interposition of "1" or "0" judiciously inserted into the digital sequence in order to avoid long series of noughts or ones. The main component of the demodulated signal is then characteristic of the variations of the power received. The corresponding "unscrambling" is performed upon reception, following demodulation. Consequently, as shown in FIG. 3, the control circuit 10 comprises an integrator circuit incorporating low-pass filters, whose output signals are characteristic of the variations in level of the demodulated signals. The variable gain amplifiers 8 and 9 must have a sufficient pass band. The amplifiers selected in the embodiment illustrated are differentital amplifiers, model MC 1733, of very wide band (120 MHz) 81. The same circuit is thus utilised for digital outputs of 8.5 or 34 Mbit/s. The gain control is exercised by variation of the emitter resistors of the transistors of these differential amplifiers by means of FET transistors 82 which act as variable resistors. Finally, for an output at zero impedance whilst having a low load resistor, the output consists of a transistor 83 connected as an emitter follower, followed by a capacitor 84 in series with a 50 ohm resistor.

As for the phase calculator, this has the task of producing a stable phase reference so that the different phase changes carrying the information may be extracted in correct manner by means of the demodulation circuit. In the particular case of direct microwave demodulation, the restoration of a carrier by multiplication is certainly precluded. Furthermore, the systems of the demodulator-remodulator type, are also excluded in view of their cost and difficulty of production.

Consequently, in the reception chain according to the invention making use of direct demodulation, the phase calculator operates on the basis of a COSTAS loop demodulation system. In this kind of system, the error voltage e needed to block the phase loop is obtained directly from the demodulated sequences X(t) and Y(t). As a matter of fact, it is possible to obtain from these two signals, an error signal characteristic of the phase difference $\theta$ between the carrier received and the local oscillation signal. An example of such a loop utilising a phase calculator of the so-called "sin $4\theta$" type is utilised in a demodulation device described in the paper by FUJITSU referred to in the foregoing.

In a preferred embodiment of the demodulation device, a more simple calculator of the "sin $4\theta$ prefix" type is utilised, $\theta$ being the phase difference between the local carrier provided by the oscillator 3 and the carrier received.

Figure 5:
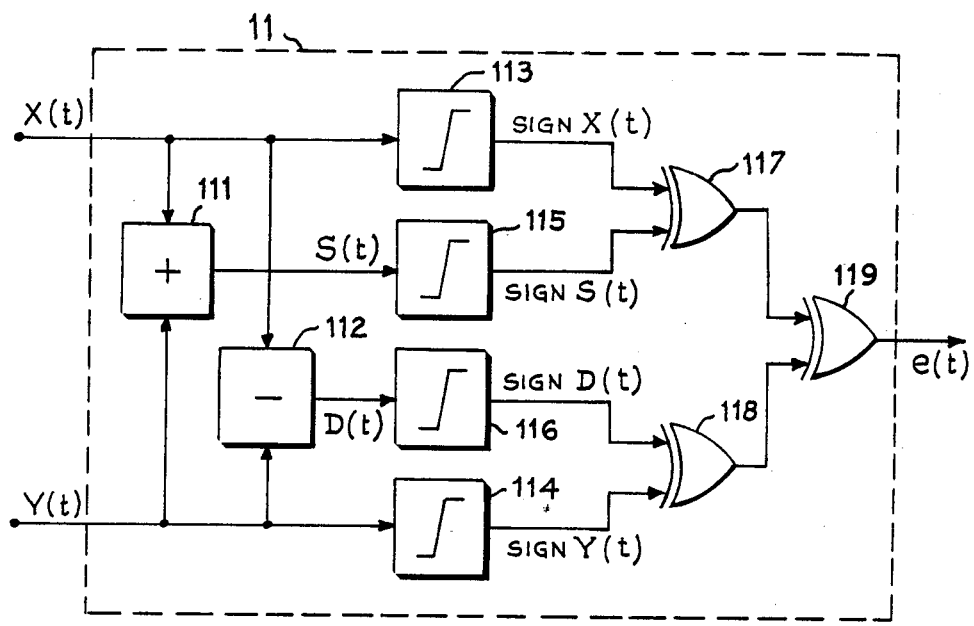
FIG. 5 is a diagram of the phase calculator utilised in the reception chain according to the invention.
Figure 4:
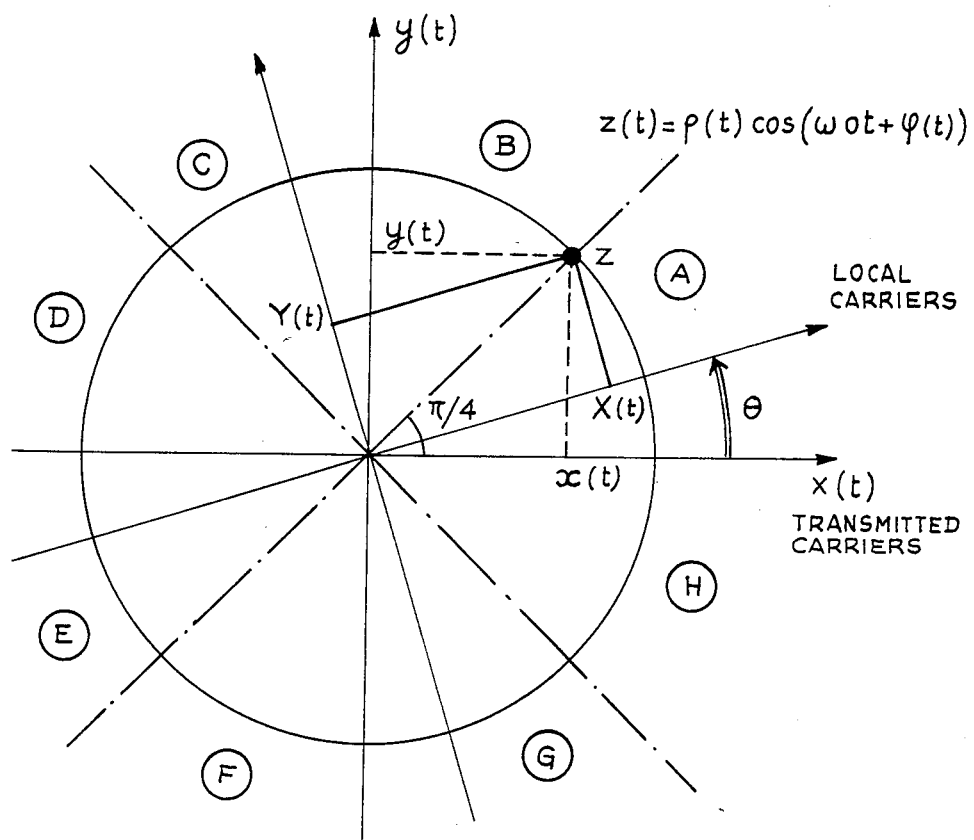
FIG. 4 is an explanatory diagram.

The diagram in FIG. 4 conveys an understanding of the operation of this calculator which is illustrated in particular in FIG. 5.

Z(t) is the composite signal resulting from combining the two carriers modulated in quadrature upon transmission $$Z(t)=P(t)[\cos(\omega_0 t+\phi(t))].$$

Let x(t) and y(t) be the modulation signals on these carriers upon being transmitted, then x(t)=y(t) in the example shown, and the modulation phase is $\phi=\pi/4$. Let X(t) and Y(t) be the signals demodulated upon reception on the carriers in quadrature coming from the local oscillator, and $\theta$ the phase difference between the carriers upon transmission and reception. An error function is calculated to evaluate this phase shift. If S(t)=X(t)+Y(t) and D(t)=X(t)−Y(t), it is possible to show that the function $$X(t).Y(t).S(t).D(t) = +\tfrac{1}{2}P^4(t)\sin 4\theta.$$

Consequently, the function has an amplitude variable as a function of time and equally varies as a function of $\theta$ following sin $4\theta$. Based on this function, it is possible to obtain an error signal by observing that sin $4\theta$ changes sign when $\theta$ passes from one $\pi/4$ sector to an adjacent sector, in the figure defined by orthogonal axes representing the carriers transmitted in quadrature, yielding the values x(t) and y(t), and the bisectors of these axes correspond to the modulation phases upon transmission. Let A,B,C . . . H be these sectors in FIG. 4.

The error function e(t)=sign $(+\tfrac{1}{2}P^4(t)\sin 4\theta)$ is positive in the sectors A,C,E,G and negative in the sectors B,D,F, and H.

This sign is the result of the product of the signs of the different components X(t),Y(t),S(t) and D(t). It would thus be possible to produce the calculator by utilising multipliers. However, the error voltage which would be obtained would have an amplitude varying with the amplitude of the incoming signal.

In a preferred embodiment of the invention, the calculator adopted is less complicated and permits obtaining an error voltage independent of the amplitude of the incoming signal.

Figures 6, 7:
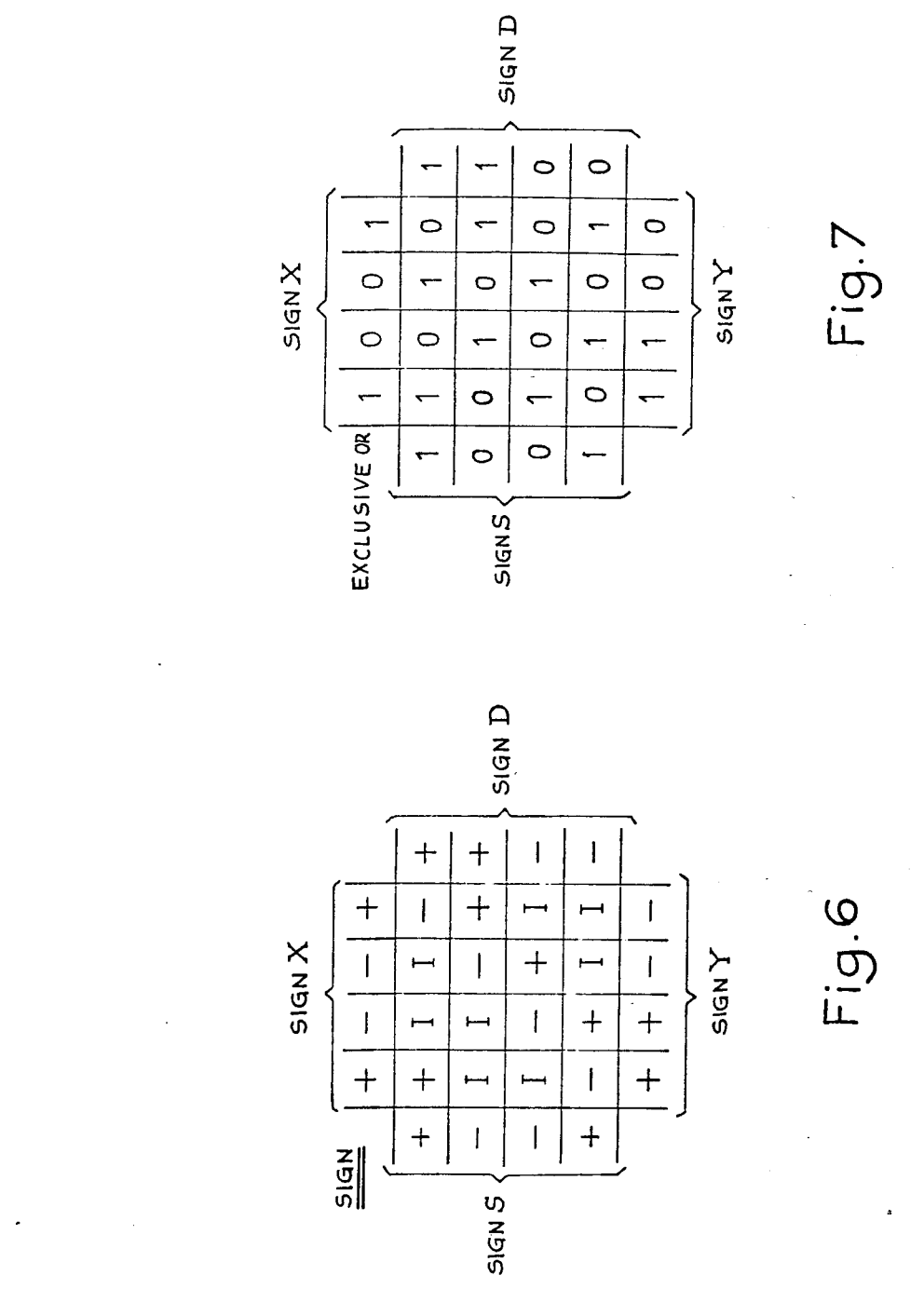

As a matter of fact, the table of FIG. 6 shows the sign of the product X(t).Y(t).S(t).D(t) as a function of the signs of the different components. Some impossible combinations are denoted by an "I". For example, when X and Y are positive, their sum cannot be negative. Similarly when X and Y are negative, their sum cannot be positive. If X is positive and Y negative, the difference D=X−Y cannot be negative, etc. . . .

FIG. 7 illustrates the result of the logic "OR EXCLUSIVE" function of the variables sign X, sign Y, sign S and sign D, where the values of the variables and of the function for "positive sign" are denoted by "1" and the same values for "negative sign" are denoted by "0". Upon comparing these two tables, it is observed that for the possible products of the variables sign X, sign Y, sign S and sign D, the "OR EXCLUSIVE" function is identical to the sign function of the product. This explains the structure of the phase calculator 11 illustrated in FIG. 5.

The signals X(t) and Y(t) at the input of the calculator 11 are connected on the one hand to the two inputs of an adder 111 whose output provides the summated signal S(t)=X(t)+Y(t), and on the other hand to the inputs of a subtractor 112 whose output provides the difference signal D(t)=X(t)−Y(t). The inputs X(t),Y(t) and the outputs S(t) and D(t) are connected to the inputs of threshold circuits 113,114,115 and 116, respectively. The outputs of these threshold circuits provide "high" and "low" logic signals, depending on whether the signs of the signals fed to their inputs is positive or negative. The outputs of these threshold circuits are grouped in pairs and connected to the inputs of two logic "OR EXCLUSIVE" gates 117 and 118, whose outputs are connected to a third logic "OR EXCLUSIVE" gate 119. The output of the gate 119 forms the output of the calculator and supplies the error voltage e(t) at the logic "high" or "low" levels depending on whether the product, and consequently sin $4\theta$, is positive or negative. This calculator has been produced by the logic emitter coupling (LEC) technology, but it would equally be possible to produce the same by TTL technology.

When the carriers transmitted and received are in phase with the local carriers, the output signal of the calculator e(t) eventually has clearcut transitions during the transitions of the signals X(t) and Y(T). By contrast, when a phase error appears between the carriers received and the local carriers, "peaks" will appear in the calculator output signal, which indicate the phase changes from one modulation state to another.

As stated in the foregoing, the output of the calculator 11 is connected to the input of a loop integrator filter 12 which integrates these "peaks" to produce the error voltage applied to the control input of the voltage-controlled oscillator.

The invention is not restricted to the embodiment described and illustrated.

In particular, the embodiment described in the foregoing has been tested for a transmission output of 34 MBits/s, on a carrier frequency of 2 GHz modulated in 4 phases. Any other combination is possible, and in particular, the same reception chain may receive lower outputs, for example 8 MBits/s. The carrier frequencies may also be of optional value. It is equally possible to adapt the reception chain for an "agile" frequency system, that is to say able to operate at different carrier frequencies, or for a spectrum expansion system.

Furthermore, the system has been described in the foregoing for a signal modulated over four phase conditions. This example is obviously not restrictive and the reception shown described is applicable to the reception of any digital modulation signal which may be put in the form of two carriers in phase quadrature, in particular those resulting from modulation comprising discrete states having 8 phases or 16 phases (16 QAM). The demodulated digital sequences may have more than two levels.

We claim:

1. A microwave reception chain comprising a circuit for direct demodulation of a modulated signal resulting from mixing two carriers in quadrature modulated by digital signals scrambled so as not to comprise long series of ones or zeros, of which the input is coupled with the received signal input, associated with an oscillator operated at the carrier frequency of the received signal, controllable so that the phase of the carrier coming from the oscillator coincides with the phase of the signal received and supplying demodulated digital signals, and furthermore comprising a phase calculator having two inputs coupled to the outputs for demodulated digital signals, of which the output provides a signal as a function of the phase difference between the received carrier and the local carrier, this output being connected to the control input of the oscillator via a loop integrator filter, wherein the arrangement also comprises means for automatically controlling the level of the demodulated digital signals X(t) and Y(t), comprising wide-band amplifiers whose signal inputs are coupled to the outputs of the direct demodulation circuit, and which comprise automatic gain control inputs, the outputs of these amplifiers being connected to the inputs of a control circuit comprising integrating means, and of which the outputs are connected to the control inputs of the amplifiers.

2. A microwave reception chain according to claim 1, wherein the phase calculator is a loop calculator establishing the sign function of the product $X(t).Y(t).S(t).D(t)$, in which S(t) and D(t) respectively are the sum and the difference of the digital signals X(t) and Y(t).

3. A microwave reception chain according to claim 2, wherein the calculator comprises a summator and a subtractor, threshold circuits and a logic circuit establishing the "OR EXCLUSIVE" function of the output signals of the threshold circuits.

* * * * *